United States Patent [19]
Muramatsu

[11] Patent Number: 6,151,091
[45] Date of Patent: Nov. 21, 2000

[54] LIQUID CRYSTAL DISPLAY DEVICE INCLUDING FILM

[75] Inventor: Eiji Muramatsu, Toyoshina-machi, Japan

[73] Assignee: Seiko Epson Corporation, Japan

[21] Appl. No.: 09/219,016

[22] Filed: Dec. 23, 1998

[30] Foreign Application Priority Data

Dec. 25, 1997 [JP] Japan .................................. 9-358617
Sep. 22, 1998 [JP] Japan ................................ 10-268536

[51] Int. Cl.[7] .............................. G02F 1/1345; G02F 1/13
[52] U.S. Cl. .......................... 349/149; 349/151; 349/152; 349/192
[58] Field of Search .................................... 349/149, 151, 349/152, 192

[56] References Cited

U.S. PATENT DOCUMENTS

| 4,655,551 | 4/1987 | Washizuka et al. | 350/334 |
|---|---|---|---|
| 5,177,596 | 1/1993 | Muramatsu et al. | 174/254 |
| 5,427,641 | 6/1995 | Muramatsu et al. | 156/252 |
| 5,717,476 | 2/1998 | Kanezawa | 349/149 |
| 5,847,796 | 12/1998 | Uchiyama et al. | 349/151 |
| 5,893,623 | 4/1999 | Muramatsu | 349/152 |
| 5,949,512 | 9/1999 | Taguchi | 349/150 |
| 5,959,713 | 9/1999 | Kobayashi | 349/149 |
| 5,986,342 | 11/1999 | Uchiyama et al. | 257/758 |

FOREIGN PATENT DOCUMENTS

| 0543635 | 5/1993 | European Pat. Off. . |
|---|---|---|
| 64-49022 | 2/1989 | Japan . |
| 01068725 | 3/1989 | Japan . |
| 64-68725 | 3/1989 | Japan . |
| 05303108 | 11/1993 | Japan . |
| 07028084 | 1/1995 | Japan . |

*Primary Examiner*—William L. Sikes
*Assistant Examiner*—Tarifur R. Chowdhury
*Attorney, Agent, or Firm*—Harness, Dickey & Pierce, P.L.C.

[57] ABSTRACT

A liquid crystal display device 11 is provided comprising two substrates constituting a liquid crystal panel 12, a lead line 14 formed on at least one substrate 13a being covered with a mold 21, wherein the contour section 19 of the mold 21 covering the lead line 14 is composed of a high-viscosity mold material 17, and the inner section 23 is composed of a low-viscosity mold material 18. The viscosity of the high-viscosity mold material 17 is of a level of non-flowability when the mold material 17 is applied, whereas the viscosity of the low-viscosity mold material 18 is of a level of flowability when the mold material 18 is applied.

12 Claims, 6 Drawing Sheets

LIQUID CRYSTAL DISPLAY DEVICE INCLUDING FILM

BACKGROUND OF THE INVENTION

1. Technical Field

The present invention relates to a liquid crystal display device, an electronic equipment, and a method for making a liquid crystal display device. In particular, the present invention relates to a mold covering a lead line formed on a transparent substrate constituting a liquid crystal panel and a method for forming the same.

2. Discussion

On a glass substrate constituting a liquid crystal panel in a liquid crystal display device, a lead line connected to a transparent electrode is formed and the exposed lead line is covered with a mold.

In the production of the liquid crystal display device, a mold material having sufficient flowability during coating is used, regions other than the position for forming a mold are covered with, for example, a masking tape, and the mold material is cast into the position surrounded by the masking tape for coating. Examples of the mold materials include silicone rubbers. After sufficiently curing the mold material, the masking tape is peeled off to form a mold on the lead line.

According to the method for making the aforementioned liquid crystal display device in which a mold is formed by masking a predetermined position using a masking tape, steps for adhering and peeling off the masking tape are required, resulting in a complicated production process.

Since the masking tape is difficult to peel off, the bonding agent of the tape may remain on the glass substrate.

Accordingly, it is an object of the present invention to provide a liquid crystal display device permitting a simplified production process, an electronic equipment, and a method for making the liquid crystal display device.

SUMMARY OF THE INVENTION (1) The first aspect of the present invention is a liquid crystal display device comprising two substrates constituting a liquid crystal panel, a lead line formed on at least one substrate being covered with a mold, wherein a contour section of the mold covering the lead line is depicted by another mold different from the mold at an inner section of the contour section.

The substrate is a glass substrate or the like.

The lead line includes an electrode, a terminal, and the like.

The material for the contour section is different from the mold material for the inner section in order to form a barrier for the mold by the material for the contour section, which is first applied during forming the mold, so that a mold material which is subsequently applied is prevented from flowing out of the contour section.

Thus, the material for forming the contour section prevents the mold material from flowing out, and has a level of non-flowability that will maintain the shape of the contour section when it is applied. The viscosity of the mold material at the inner section may have a level of flowability that can form a substantially flat surface in the inner section when it is applied.

(2) The second aspect of the present invention is a liquid crystal display device comprising two substrates constituting the liquid crystal panel, a lead line formed on at least one substrate being covered with a mold, wherein the contour section of the mold covering the lead line comprises a high-viscosity mold material, and the inner section comprises a low-viscosity mold material.

The viscosity of the mold material of the contour section is set to be higher than the viscosity of the mold material of the inner section in order to prevent the overflow of the low-viscosity mold material by the contour section as a barrier which is previously formed with the high-viscosity mold material.

Thus, the viscosity of the high-viscosity mold material is of a level of non-flowability such that the mold material can maintain its shape when it is applied, whereas the viscosity of the low-viscosity mold material is of a level of flowability such that the mold material can form a substantially flat surface in the inner section when it is applied.

(3) The liquid crystal device of a third aspect of the present invention is characterized in that the high-viscosity mold material and the low-viscosity mold material are the silicone materials described in the second aspect.

The use of liquid silicone rubbers as these silicone materials is preferred. Liquid silicone rubbers are classified into a condensation type, an addition type, and a UV-curing type in terms of reaction-curing types. Their packaging states are classified into a one-component type and a two-component type. Among them, one-component condensation type liquid silicone rubbers can be cured at room temperature and have superior adhesiveness.

The silicone materials may contain any cross-linking agents, curing catalysts, fillers, additives, and plasticizers or the like.

(4) In the liquid crystal device of the first aspect of the present invention, an external connecting terminal other than the lead line may be formed on the at least one substrate, and the contour section may be formed so as to separate the lead line from the external connecting terminal. The term "external connecting terminal" means a terminal connected to an external circuit by a rubber connector or other lead elements.

In accordance with the liquid crystal device having such a configuration, the contour section of the mold is formed so as to separate the lead line from the external connecting terminal; hence the flow of the mold towards the external connecting terminal is prevented.

(5) In the liquid crystal device described in the paragraph (4), the contour section of the mold may be formed only in a peripheral region of the external connecting terminal. The flow of the mold towards the external connecting terminal can be securely prevented.

(6) An electronic equipment in a fourth aspect in accordance with the present invention comprises a liquid crystal display device having a configuration as described above, and a casing for containing the liquid crystal display device. Examples of the electronic devices include portable phones, wrist watches, notebook personal computers and the like.

(7) A fifth aspect of the present invention is a method for making a liquid crystal display device comprising two substrates constituting a liquid crystal panel, a lead line formed on at least one substrate being covered with a mold, the method being characterized in that a contour section of the mold covering the lead line is formed using a high-viscosity material, and then the inner section is formed using a low-viscosity mold material. This is a method for making the liquid crystal display device of the second aspect of the present invention.

(8) In a sixth aspect of the present invention, a method for making a liquid crystal device is characterized in that, in the fifth aspect of the present invention mentioned in (7), the high-viscosity mold material and the low-viscosity mold material are silicone materials.

The silicone materials have been described in the third aspect.

DETAILED DESCRIPTION OF THE PREFERRED EMBODIMENTS

A liquid crystal device in accordance with the present invention will now be described together with a method for making the device with reference to the drawings.

Figure 1:
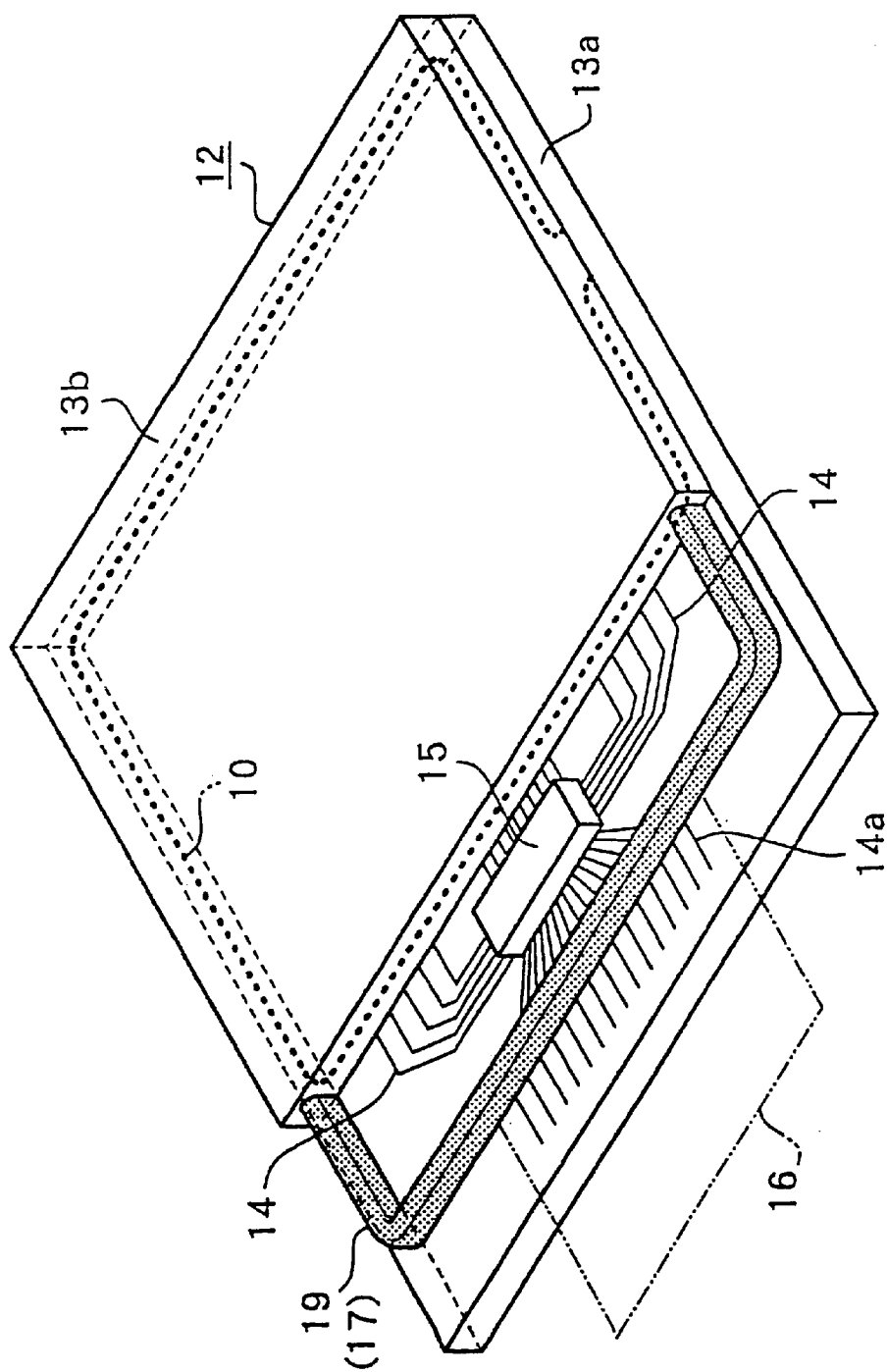
FIG. 1 is a perspective view showing one step of an embodiment of a method for making a liquid crystal display device in accordance with the present invention.

As shown in FIG. 1, two glass substrates 13a and 13b constituting a liquid crystal panel 12 are bonded to each other with a sealing member 10, a plurality of lead lines 14 connected to a transparent electrode (not shown in the drawing) is formed on the glass substrate 13a. These lead lines 14 are connected to a driver IC 15 mounted on the glass substrate 13a.

Lead lines 14a form an external connecting terminal extending from the driver IC 15 and connected to a flexible wiring substrate 16 are also formed on the glass substrate 13a. A rubber connector or a ZEBRA connector may be connected instead of the flexible wiring substrate 16.

In the molding treatment of the liquid crystal panel 12 having the above-mentioned configuration, two mold materials for the inner section 23 (see FIG. 2) and the contour section 19 are prepared. These materials for the inner section and the contour section are different from each other.

Examples of materials for forming the contour section 19 include inks, UV mold materials, epoxy resins, and Si mold materials. The contour section 19 is applied in a small amount, and then the inner section 23 is applied. The viscosity level of the mold material for the contour section 19 is that having non-flowability which can prevent overflow of the mold of the inner section 23 and can maintain the shape of the contour section 19 when it is applied. Thus, it is not necessary for the material for the contour section 19 to have a particularly high viscosity.

A method, other than a coating process, for depicting the contour section 19 as a dam for stopping the flow of the inner section 23 is an ink process by ink-jet, a printing process, or a stamp transfer process for applying a low viscosity mold material in a small amount. The contour section 19 may have various shapes depending on the shape of the lead lines 14. Since the mold material of the contour section 19 does not have flowability, the as-applied mold material functions as the contour section 19. The height of the contour section 19 is less than the height of the upper face of the driver IC 15. The width of the contour section 19 is of a level which does not cause destruction or deformation of the contour section 19 by the pressure of the mold material fed into the inner section 23 at the interior of the contour section 19.

The viscosity of the mold material for forming the inner section 23 has a level that will allow the mold material to form a substantially flat surface in the contour section 19 when it is applied.

According to this embodiment, after the contour section 19 is formed with a mold material, the mold material for the inner section 23 is applied; hence a mold having a predetermined shape can be formed by using only two types of mold materials.

Since no conventional step for adhering a masking tape nor for stripping the tape is required, the production process of liquid crystal display devices can be simplified.

Since no masking tape is used, there is no possibility that the adhesive agent of the tape remains on the glass substrate.

Since the contour section 19 of the mold 21 is formed so as to separate the lead lines 14 from the external connecting terminal 14a, the overflow of the mold 21 onto the external connecting terminal 14a which is connected to a flexible wiring substrate 16 is prevented.

As an embodiment which is different from the above-mentioned embodiment, a low-viscosity mold material 18 is prepared as a mold material for the inner section 23, and a high-viscosity mold material 17 is prepared as another mold material which is different from the material for the inner section 23. One-component condensation type liquid silicone rubbers are preferable as these mold materials 17 and 18.

The viscosity level of the high-viscosity mold material 17 is that having non-flowability which can maintain the shape of the contour section 19 when mold material 17 is applied. In contrast, the viscosity of the low-viscosity mold material 18 is at a level of flowability such that the mold material 18 can form a substantially flat surface in the contour section 19 when it is applied.

As shown in FIG. 1, the high-viscosity mold material 17 is first applied so as to form the contour section 19 of the mold for covering the lead lines 14. The contour section 19 may have various shapes depending on the shape of the lead lines 14. Since the high-viscosity mold material 17 does not have flowability, the as-applied material functions as the contour section 19. The height of the contour section 19 is substantially the same as the height of the upper face of the driver IC 15. The width of the contour section 19 is of a level which does not cause destruction or deformation of the contour section 19 by the pressure of the mold material 18 fed into the interior of the contour section 19.

Figure 2:
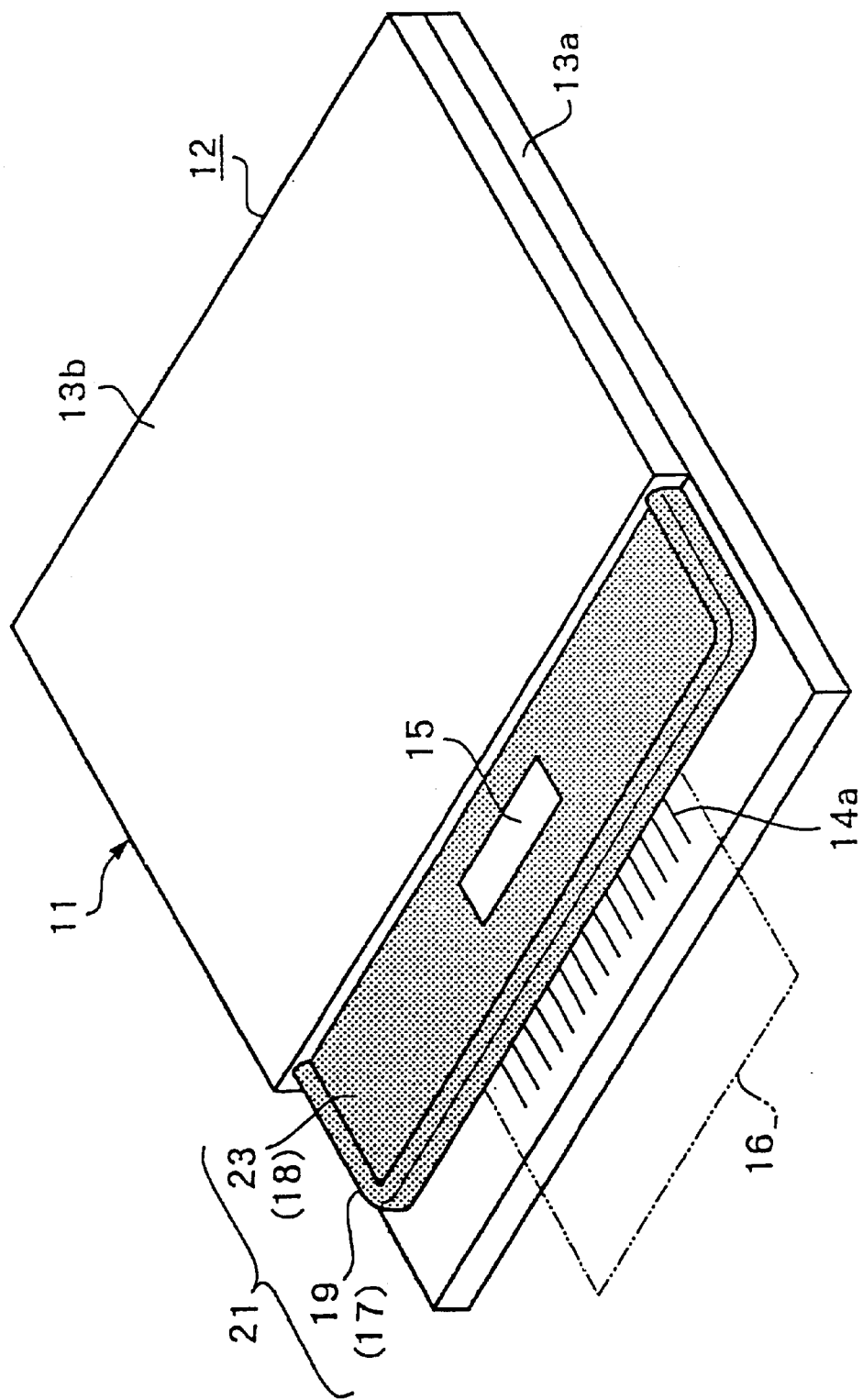
FIG. 2 is a perspective view of an embodiment of a method for making a liquid crystal display device in accordance with the present invention.

Next, as shown in FIG. 2, the low-viscosity mold material 18 is cast into the interior of the contour section 19. Since the applied low-viscosity mold material 18 has low viscosity and thus high fluidity, the surface is substantially planarized.

The high-viscosity mold material 17 of the contour section 19 and the low-viscosity mold material 18 of the inner section 23 are cured for a predetermined time. A liquid crystal display device 11 in which the lead lines 14 are covered with the mold 21 is thereby obtained.

According to this embodiment, after the contour section 19 of the mold 21 is formed by the high-viscosity mold material 17, the low-viscosity mold material 18 for the inner section 23 is applied. Thus, a mold 21 having a predetermined shape can be formed by using two types of mold materials 17 and 18 having different viscosity levels.

Silicone materials as the mold materials 17 and 18, and particularly one-component condensation type liquid silicone rubbers allow curing at room temperature and improve adhesiveness.

Since no conventional step for adhering a masking tape nor for stripping the tape is required, the production process of liquid crystal display devices can be simplified.

Since no masking tape is used, there is no possibility that the adhesive agent of the tape remains on the glass substrate.

Since the contour section 19 of the mold 21 is formed so as to separate the lead lines 14 from the external connecting terminal 14a, the overflow of the mold 21 onto the external connecting terminal 14a which is connected to a flexible wiring substrate 16 is prevented.

A method, other than a coating process, for depicting the contour section 19 as a dam for stopping the flow of the mold of the inner section 23 is an ink process by ink-jet, a printing process, or a stamp transfer process for applying a low viscosity mold material in a small amount. The contour section 19 may have various shapes depending on the shape of the lead lines 14.

The liquid crystal display device 11 in accordance with the above-mentioned embodiment is of a COG type in which the driver IC 15 is mounted on the glass substrate 13. The present invention is also applicable to liquid crystal display devices other than this type, in which lead lines are covered with a mold having a predetermined shape.

Figure 5:
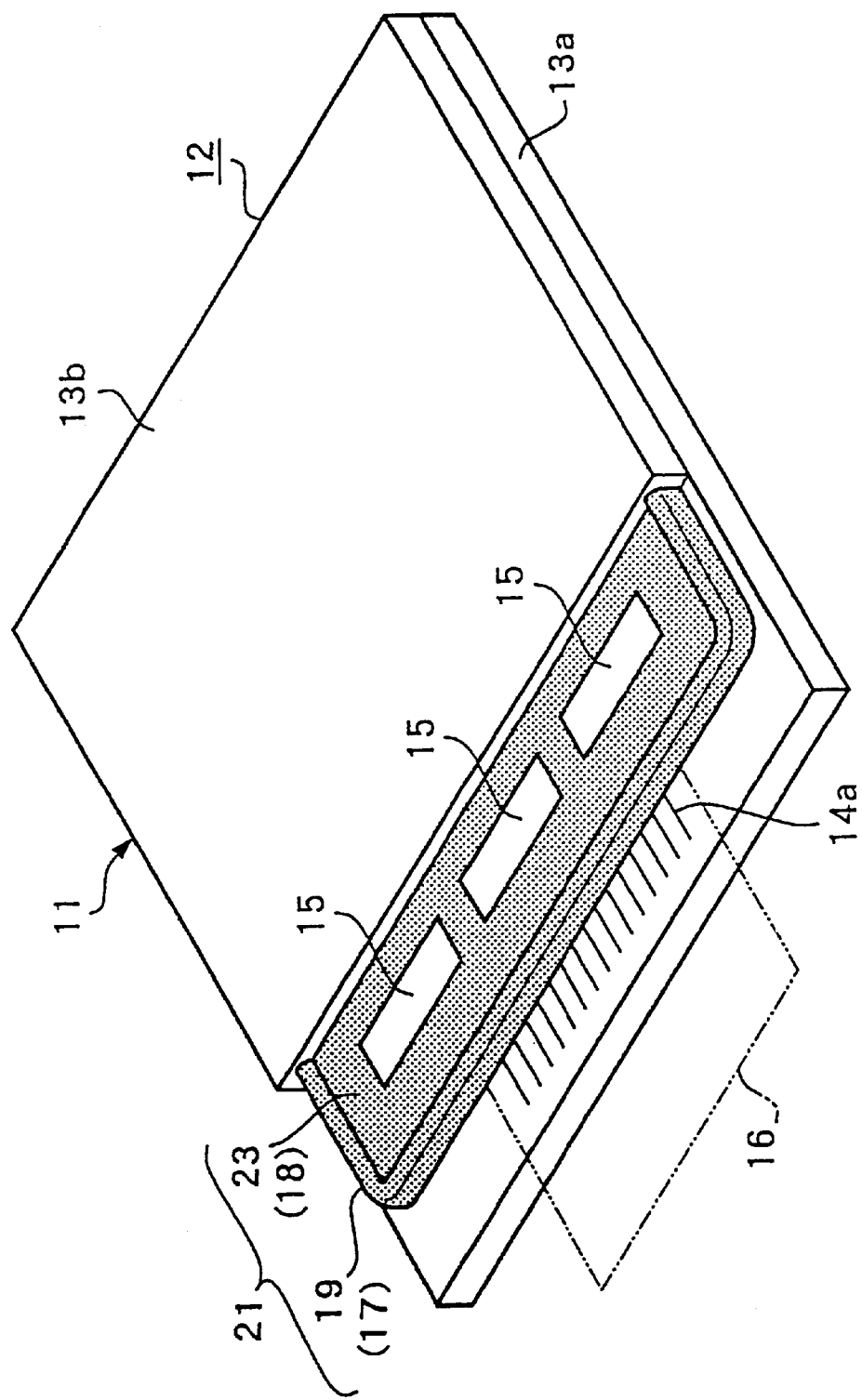
FIG. 5 is a perspective view of another embodiment of a method for making a liquid crystal display device in accordance with the present invention.

Although the liquid crystal display device 11 in accordance with the above-mentioned embodiment has one driver IC 15, the number of drivers IC 15 is not limited. For example, as shown in FIG. 5, three driver ICs 15 may be provided.

Figure 3:
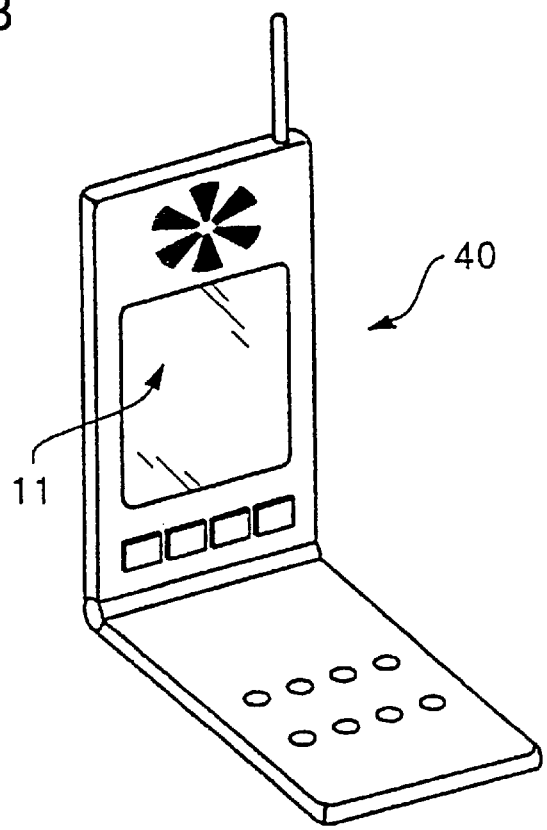
FIG. 3 is a perspective view of a portable phone as an embodiment of an electronic equipment in accordance with the present invention.

FIG. 3 shows a portable phone as an embodiment of the electronic equipment in accordance with the present invention. The portable phone 40 has a liquid crystal display device 11 as a display section assembled into a casing.

Figure 4:
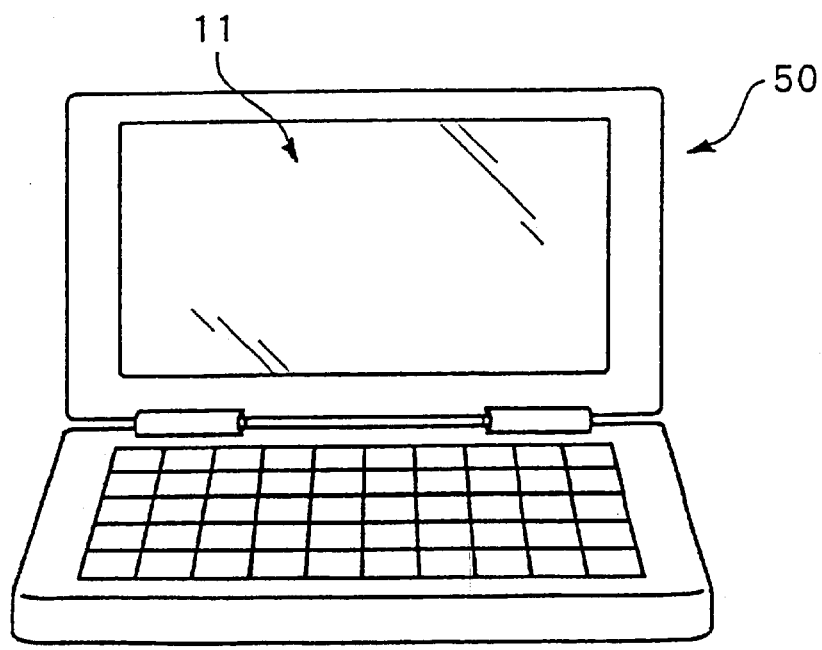
FIG. 4 is a perspective view of a notebook personal computer as another embodiment of an electronic equipment in accordance with the present invention.

FIG. 4 shows a notebook personal computer as another embodiment of the electronic equipment in accordance with the present invention. The notebook personal computer 50 has a liquid crystal display device 11 as a display section assembled into a casing.

Figure 7:
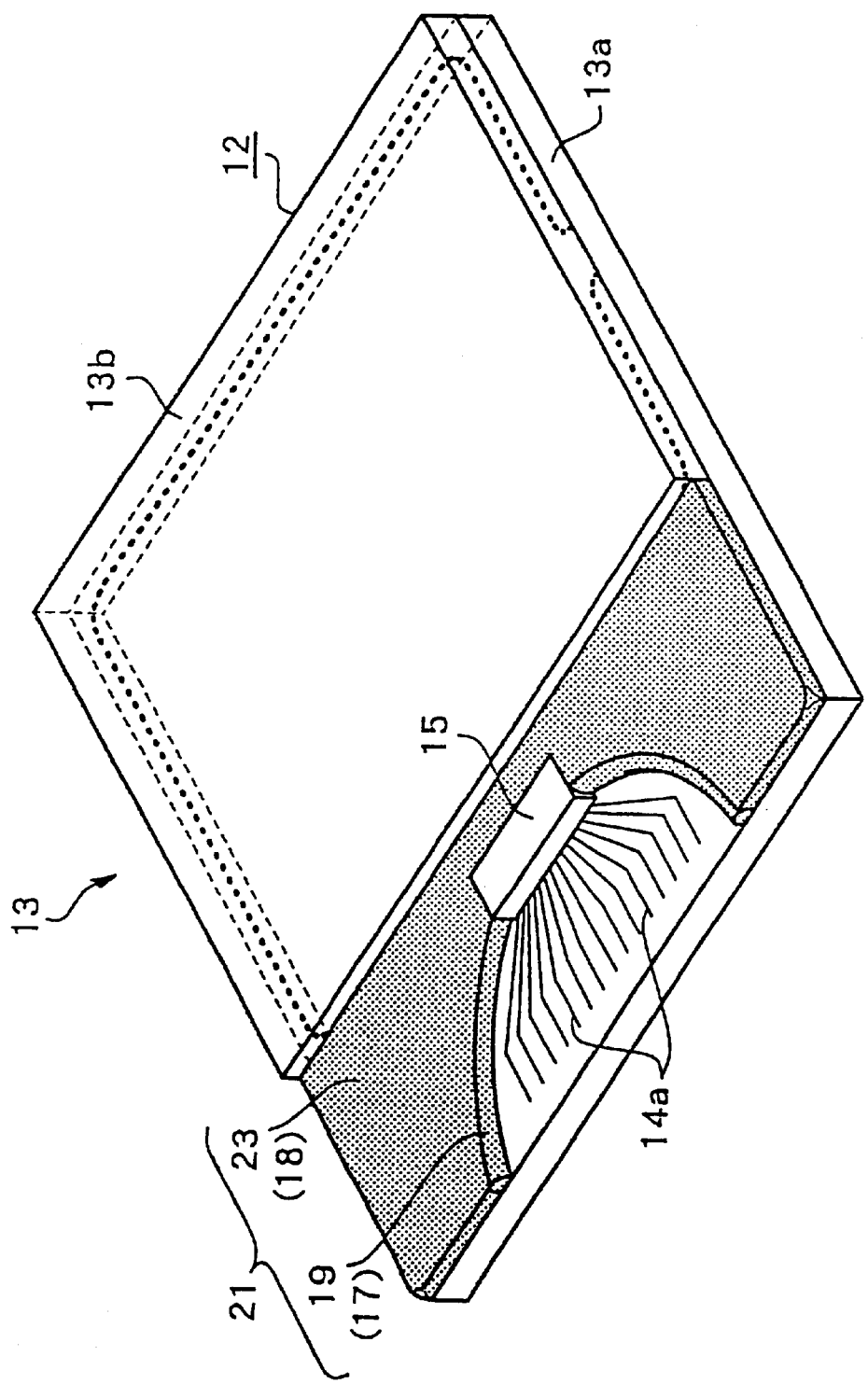
FIG. 7 is a perspective view of still another embodiment of a method for making a liquid crystal display device in accordance with the present invention.

FIG. 7 shows another embodiment of the liquid crystal device in accordance with the present invention. In the liquid crystal display device 13, one substrate 13a of the liquid crystal panel 12 is provided with a mold 21. The liquid crystal panel 12 is the same as the liquid crystal panel 12 shown in FIG. 1, having lead lines 14 and the external connecting terminal 14a on the surface of one substrate 13a. The external connecting terminal 14a is a terminal connected to an external circuit, for example, a control circuit of an electronic equipment, by a rubber connector or other lead elements.

Figure 6:
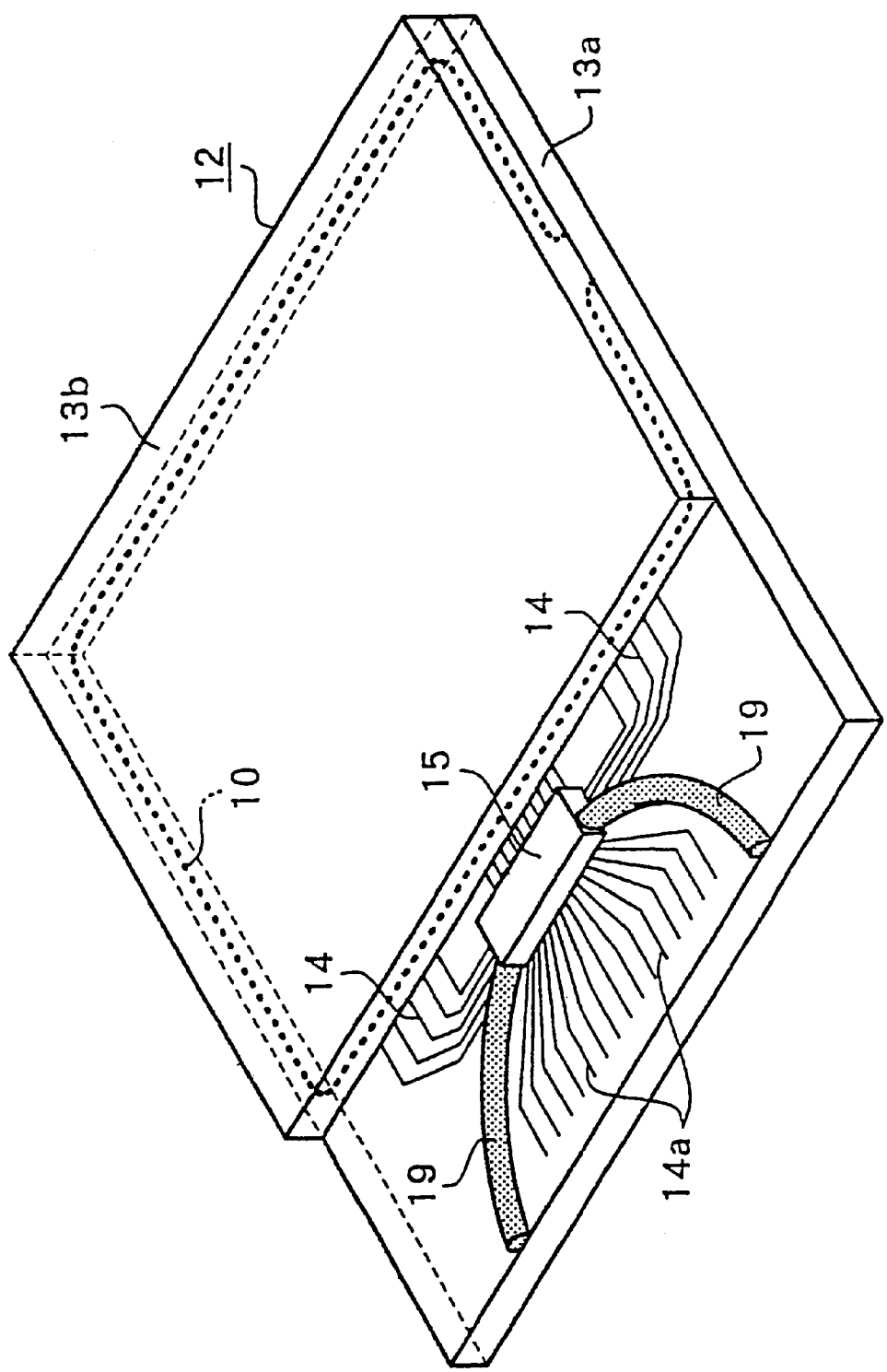
FIG. 6 is a perspective view showing one step of another embodiment of a method for making a liquid crystal display device in accordance with the present invention.

In this embodiment, as shown in FIG. 6, the contour section 19 of the mold 21 is formed at a position for separating the lead lines 14 from the external connecting terminal 14a, and in particular, only at the peripheral section of the external connecting terminal 14a. Next, as shown in FIG. 7, the inner section 23 of the mold 21 is formed so as to cover the region including the lead lines 14. Also, in this embodiment, the contour section 19 may be formed of a high-viscosity mold material compared with the inner section 23.

Also, in this embodiment, a mold 21 having a predetermined shape can be formed using two mold materials 17 and 18 having different viscosity levels. Since the conventional step for adhering a masking tape or for stripping the tape is not required, the production process of liquid crystal display devices can be simplified. Since a masking tape is not used, there is no possibility that the adhesive agent of the tape remains on the glass substrate.

Since the contour section 19 of the mold 21 is formed so as to separate the lead lines 14 from the external connecting terminal 14a, the overflow of the mold 21 onto the external connecting terminal 14a which is connected to a rubber connector or the like is prevented. In particular in this embodiment, the contour section 19 is formed only in the peripheral region of the external connecting terminal 14a; hence the flow of the mold 21 towards the external connecting terminal 14a can be securely prevented.

A method, other than a coating process, for depicting the contour section 19 as a dam for stopping the flow of the mold of the inner section 23 is an ink process by ink-jet, a printing process, or a stamp transfer process for applying a low viscosity mold material in a small amount. The contour section 19 may have various shapes depending on the shape of the lead lines 14.

In each embodiment described above, a liquid crystal display device was produced under the following conditions:

High-viscosity mold material: silicone adhesive RTV rubber made by Dow Corning Toray Silicone Co., Ltd. [Commercial Name: SE9186; viscosity: 70 Pa·S (700 Poise)]

Low-viscosity mold material: silicone adhesive RTV rubber made by Dow Corning Toray Silicone Co., Ltd. [Commercial Name: SE9187L; viscosity: 1 Pa·S (10 Poise)]

Lead lines were covered with a mold having a predetermined shape according to this Example.

According to the present invention, the mold for covering lead lines can be easily formed and the production process is simplified.

What is claimed is:

1. A liquid crystal display device comprising two substrates constituting a liquid crystal panel, a lead line formed on at least one of said substrates and being covered with a mold film,
   wherein a contour section of said mold film covering said lead line is formed by a first mold material that is different from a second mold material at an inner section of said mold film, said contour section having a height which is less than or equal to a height of a driver circuit on said at least one substrate.

2. The liquid crystal display device according to claim 1, wherein said contour section of said mold film covering said lead line comprises a high-viscosity mold material, and said inner section comprises a low-viscosity mold material.

3. The liquid crystal display device according to claim 2, wherein said high-viscosity mold material and said low-viscosity mold material are silicone materials.

4. The liquid crystal display device according to claim 1, wherein an external connecting terminal other than said lead line is formed on said at least one substrate, and said contour section is formed so as to separate said lead line from said external connecting terminal.

5. The liquid crystal display device according to claim 4, wherein said contour section is formed only in a peripheral region of said external connecting terminal.

6. An electronic equipment comprising a liquid crystal display device according to claim 1, and a casing for containing the liquid crystal display device.

7. A method for making a liquid crystal display device comprising two substrates constituting a liquid crystal panel, a lead line formed on at least one of said substrates and being covered with a mold film, the method comprising:

forming a contour section of said mold film covering said lead line using a high-viscosity material, said contour section having a height which is less than or equal to a driver circuit on said at least one substrate, and then forming an inner section of said mold film using a low-viscosity mold material.

8. The method for making a liquid crystal display device according to claim 7, wherein said high-viscosity mold material and said low-viscosity mold material are silicone materials.

9. A liquid crystal display device comprising:

a liquid crystal panel including a first and a second substrate;

at least one lead line disposed on said first substrate; and a mold film covering said at least one lead line, wherein said mold film includes a contour section formed of a first mold material having a first viscosity and an inner section formed of a second mold material having a second viscosity, said contour section having a height which is less than or equal to a driver circuit on said first substrate.

10. The liquid crystal display device of claim 9 wherein said first viscosity is greater than said second viscosity.

11. The liquid crystal display device of claim 9 wherein said first and second mold materials further comprise silicone materials.

12. The liquid crystal display device of claim 9 wherein one lead line from an external connecting terminal is formed on said first substrate.

* * * * *

UNITED STATES PATENT AND TRADEMARK OFFICE
CERTIFICATE OF CORRECTION

PATENT NO : 6,151,091

DATED : November 21, 2000

INVENTOR(S) : Eiji Muramatsu

It is certified that error appears in the above-identified patent and that said Letters Patent are hereby corrected as shown below:

Col. 5, line 25-26, "low viscosity" should be --low-viscosity--
Col. 6, line 24-25, "low viscosity" should be --low-viscosity--

Signed and Sealed this

Fifteenth Day of May, 2001

*Attest:*

NICHOLAS P. GODICI

*Attesting Officer*     *Acting Director of the United States Patent and Trademark Office*